US008844659B2

(12) United States Patent
Pieralisi

(10) Patent No.: US 8,844,659 B2
(45) Date of Patent: Sep. 30, 2014

(54) MOTOR VEHICLE WITH ELECTRIC MOTOR

(75) Inventor: Gennaro Pieralisi, Jesi (IT)

(73) Assignee: Pieralisi Maip Societa' per Azioni, Jesi (AN) (IT)

( * ) Notice: Subject to any disclaimer, the term of this patent is extended or adjusted under 35 U.S.C. 154(b) by 188 days.

(21) Appl. No.: 13/500,730

(22) PCT Filed: Sep. 24, 2010

(86) PCT No.: PCT/EP2010/064130
§ 371 (c)(1),
(2), (4) Date: Apr. 6, 2012

(87) PCT Pub. No.: WO2011/042317
PCT Pub. Date: Apr. 14, 2011

(65) Prior Publication Data
US 2012/0197474 A1 Aug. 2, 2012

(30) Foreign Application Priority Data
Oct. 8, 2009 (IT) .............................. AN2009A0075

(51) Int. Cl.
| | |
|---|---|
| *B60W 20/00* | (2006.01) |
| *B60K 6/46* | (2007.10) |
| *B60K 6/442* | (2007.10) |
| *B60L 11/14* | (2006.01) |
| *B60K 6/26* | (2007.10) |
| *B60L 11/08* | (2006.01) |
| *B60L 11/12* | (2006.01) |
| *B60K 6/387* | (2007.10) |
| *B60K 1/00* | (2006.01) |

(52) U.S. Cl.
CPC .............. *B60L 11/14* (2013.01); *Y02T 10/6234* (2013.01); *Y02T 10/6217* (2013.01); *B60K 6/46* (2013.01); *B60K 6/442* (2013.01); *Y02T 10/7077* (2013.01); *B60K 2001/001* (2013.01); *B60K 6/26* (2013.01); *B60L 11/08* (2013.01); *B60L 11/123* (2013.01); *B60K 6/387* (2013.01); *Y02T 10/7005* (2013.01)
USPC ................................... 180/65.285

(58) Field of Classification Search
CPC ........................ B60L 11/14; B60K 2001/001
USPC .......................... 701/22; 180/65.285; 903/903
See application file for complete search history.

(56) References Cited

U.S. PATENT DOCUMENTS

| | | | | | |
|---|---|---|---|---|---|
| 3,620,323 | A | * | 11/1971 | Maeda et al. ............... | 180/65.25 |
| 5,635,805 | A | | 6/1997 | Ibaraki et al. | |
| 6,433,451 | B1 | * | 8/2002 | Cherciu .......................... | 310/115 |
| 6,659,901 | B2 | * | 12/2003 | Sakai et al. .................. | 475/218 |
| 7,104,921 | B2 | * | 9/2006 | Shimizu ........................... | 477/5 |
| 7,270,203 | B2 | * | 9/2007 | Hsu .......................... | 180/65.285 |
| 7,347,803 | B2 | * | 3/2008 | Kobayashi et al. .............. | 477/5 |
| 2009/0250274 | A1 | * | 10/2009 | Reinhart et al. ............. | 180/65.6 |

FOREIGN PATENT DOCUMENTS

EP  0867324 A2  9/1998

OTHER PUBLICATIONS

"Traction control of anti-directional-twin-rotary motor drive based on electric vehicle driving simulator," Power Electronics Specialists Conference 1998, vol. 1, Aug. 6, 2002, pp. 578-582.
International Search Report for PCT/EP2010/064130 mailed Nov. 22, 2010.

* cited by examiner

*Primary Examiner* — J. Allen Shriver, II
*Assistant Examiner* — Brian Cassidy
(74) *Attorney, Agent, or Firm* — Lowe Hauptman & Ham, LLP

(57) ABSTRACT

A motor vehicle comprising an electric motor, at least one battery, and an electronic regulation unit connected to a potentiometer of the accelerator to regulate the power supply of the electric motor. The stator of the electric motor is rotatably mounted on two fixed supports joined to the frame of the vehicle, an axle shaft of a wheel is connected to the stator and the axle shaft of the other wheel is connected to the rotor. The vehicle additionally comprises a rotation reversing device to reverse the rotation of one of the two axle shafts of the wheels with respect to the rotation of the rotor or stator, respectively, an endothermic motor, an electric generator connected to the battery and a three way clutch to couple the endothermic motor to the generator and/or stator of the electric motor.

8 Claims, 3 Drawing Sheets

MOTOR VEHICLE WITH ELECTRIC MOTOR

RELATED APPLICATIONS

The present application is a National Phase of International Application Number PCT/EP2010/064130, filed Sep. 24, 2010, and claims priority from, Italian Application Number AN2009A000075, filed Oct. 8, 2009.

The present patent application for industrial invention relates to a motor vehicle with electric motor.

Motor vehicles with electric motor powered by batteries are known. However, said vehicles are impaired by the fact that they have limited power and also limited duration of the battery charge. Consequently, the vehicle can only be used for a short time and needs to stop to charge the battery.

To solve these problems at least partially, hybrid vehicles provided with electric motor and internal combustion engine are known. When a large amount of energy is necessary, energy is taken both from the combustion engine and the electric motor. Moreover, the combustion engine is also used to charge the batteries.

As it is known, all electric and hybrid vehicles are provided with differential gear applied to the driving wheels. The differential gear is used to prevent the driving wheels from skidding off the curve, adjusting their speed to the length of the trajectory. Because of the differential gear the external wheel can revolve more rapidly than the internal wheel without skidding.

It appears evident that the differential gear is a complex, expensive device.

The purpose of the present invention is to eliminate the drawbacks of the prior art by devising a motor vehicle with electric motor that does not require the differential gear.

Another purpose of the present invention is to provide such a motor vehicle with electric motor that is efficient, efficacious, reliable and simple to make.

These purposes have been achieved by the invention with the characteristics illustrated in the attached independent claim 1.

Advantageous embodiments are disclosed in the dependent claims.

The motor vehicle of the invention comprises:

- an electric motor comprising a rotor rotatably mounted on a stator, said electric motor being adapted to drive two axle shafts in rotation, respectively provided with driving wheels of the vehicle,
- at least one battery to electrically power said electric motor, and
- an electronic regulation unit connected to a potentiometer of the accelerator to adjust the power supply of said electric motor.

The stator of said electric motor is rotatably mounted on two fixed supports joined to the frame of the vehicle in order to rotate in opposite direction with respect to the rotation direction of the rotor.

An axle shaft of a wheel is operatively connected to the stator in order to be driven into rotation by the stator; whereas the axle shaft of the other wheel is operatively connected to the rotor in order to be driven into rotation by the rotor.

The motor vehicle also comprises:

- a rotation reversing device to reverse the rotation of one of the two axle shafts of the wheels with respect to the rotation of the rotor or stator.
- an endothermic motor provided with a drive shaft,
- an electric generator electrically connected to said at least one battery, and
- a three-way clutch for coupling the drive shaft of said endothermic motor to the generator and/or stator of said electric motor.

The advantages of the motor vehicle of the invention are evident.

The use of an electric motor with stator rotatably mounted in the frame of the vehicle allows for connecting the axle shaft of a wheel to the stator and the axle shaft of the other wheel to the rotor. This avoids the need to mount a differential gear on the two axle shafts of the driving wheels.

In fact, during a curve, the shorter travel covered by the internal wheel causes the rotor to make a number of revolutions lower than the stator or vice versa, without affecting the operation of the electric motor.

The endothermic motor of the vehicle of the invention is not connected to the axle shafts of the driving wheels as in known hybrid vehicles. In fact, the endothermic motor of the vehicle of the invention can be connected by means of a clutch to the generator to charge the battery or can be connected to the stator of the electrical motor to increase the power available for the vehicle compared to the power supplied by the electric motor only or can be connected to both generator and stator.

In this way the motor vehicle of the invention, with the contribution of the power of the endothermic motor, can travel at high speed while keeping the battery charged.

Additional characteristics of the invention will become more evident from the detailed description below, which refers to a merely illustrative, not limiting, embodiment, as shown in the enclosed figures, wherein.

With reference to the figures the motor vehicle with electric motor of the invention is described.

The vehicle of the invention comprises an electric motor (M1) to drive in rotation the two driving wheels (1a, 1b) of the vehicle. Referring to the technical drawings, the left-hand driving wheel is indicated with (1a) and the right-hand driving wheel is indicated with (1b).

Figure 2:
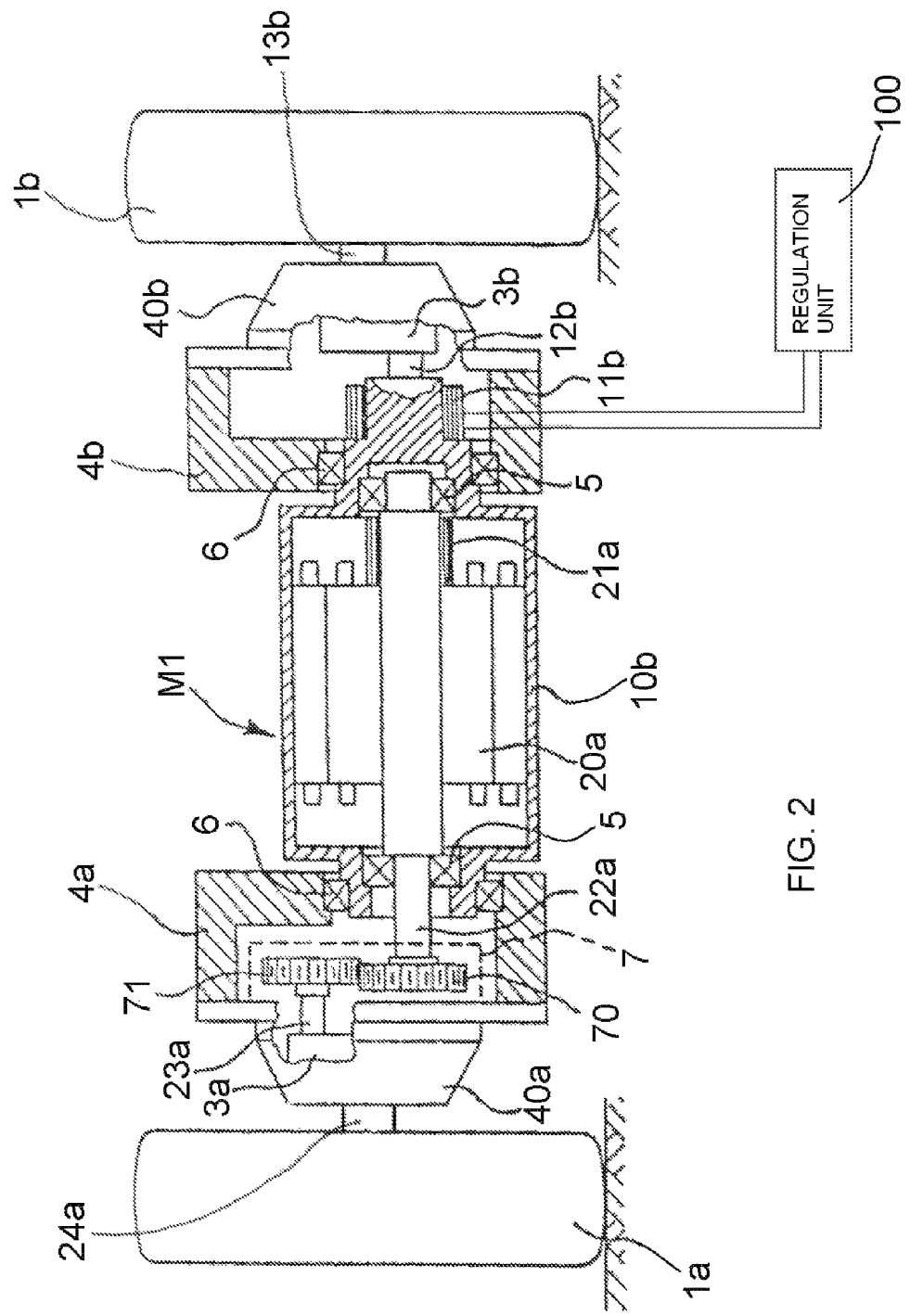
FIG. 2 is a diagrammatic view, partially in axial section, that shows the connection of the electric motor to the driving wheels.

Referring to FIG. 2, the electric motor (M1) comprises a rotor (20a) and a stator (10b). The rotor (20a) is splined on a shaft (22a) that is rotatably mounted inside the stator (10b) by means of bearings (5).

The stator (10b) is rotatably mounted in two fixed supports (4a, 4b) by means of bearings (6). So the stator (10b) can rotate in opposite direction with respect to the rotor (20a). The fixed supports (4a, 4b) are joined to the fixed frame of the vehicle.

For illustrative, not limiting purposes, the electric motor (M1) can be of direct current type. In such a case the rotor (20a) of the motor must be powered in current. Therefore, two rows of rotary electric contacts (11b, 21a) of brush-type are provided and connected in series.

The first row of rotary electric contacts (11b) is disposed outside the stator (10b) inside the fixed support (4b). The first row of rotary electric contacts (11b) provides for a rotary collector integral with an end section of the stator and brushes joined to the fixed support (4b) and electrically connected to an electronic regulation unit (100) of the vehicle used to power the electric motor (M1). A suitable control system to modulate the revolution speed of the motor (M1) according to the acceleration given by the user to the vehicle is implemented in the electronic regulation unit (100). In case of direct current motor the control system of the electronic unit (100) regulates the current intensity.

The second row of rotary electric contacts (21a) is arranged inside the stator (10b) to provide electric communication between stator and rotor. The second row of rotary electric contacts (21a) provides for a collector joined to the rotor and a set of brushes integral with the stator.

Figure 3:
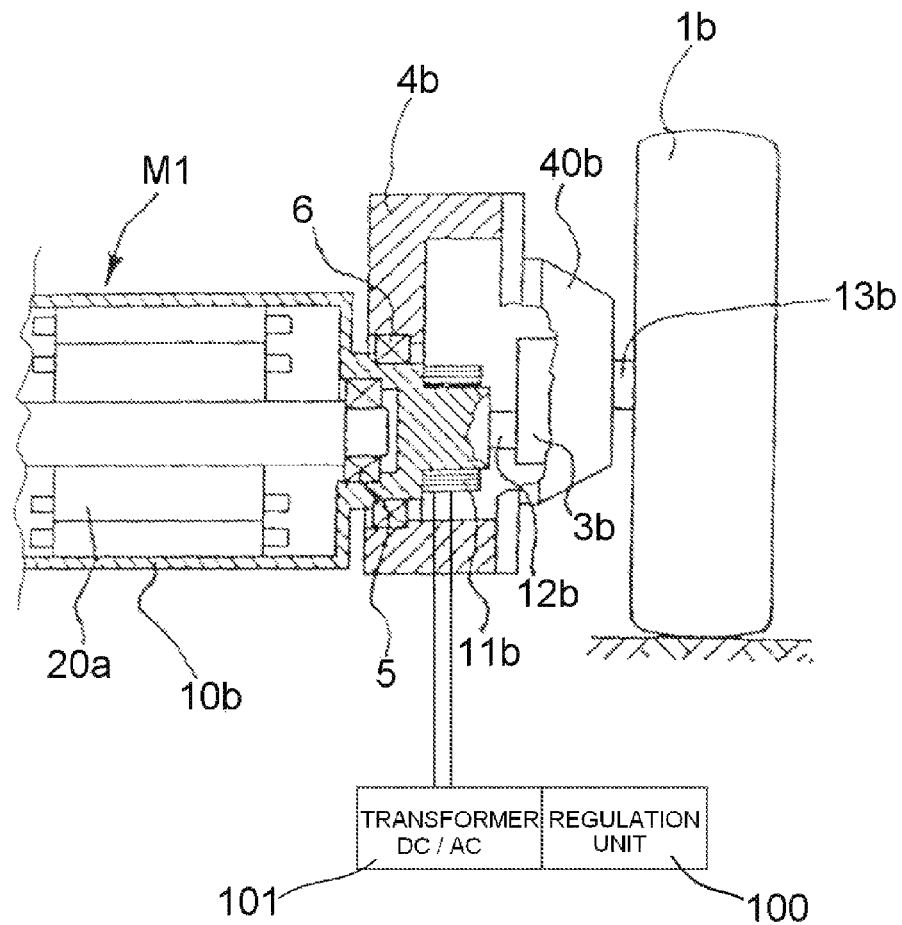
FIG. 3 is a sectional view as FIG. 2 that partially shows an alternating current motor.

FIG. 3 shows a preferred embodiment of the alternating current electric motor (M1). In such a case it is sufficient to electrically power the stator and not the rotor; therefore the second row of rotary contacts is eliminated and only the first row of rotary contacts (11b) is maintained because the stator (10b) revolves in any case.

A simple regulation unit (100) is no longer sufficient with the alternating current motor, and a transformer (101) is necessary to transform the current of the battery from direct to alternating, perhaps not perfectly sinusoidal (for example halfway between sinusoidal and square wave).

In such a case, a suitable control system is implemented in the electronic regulation unit (100), such for example an inverter, which regulates the frequency of the alternating current in such a way to vary the revolution speed of the electric motor (M1).

The alternating current must reach the stator of the motor (and no longer the rotor). In such a case only the first row of rotary contacts is necessary (11b).

The alternating current motor has several advantages because it is constructively simpler and less expensive than the direct current motor and only needs one row of rotary contacts. The transformer (101) and the inverter of the electronic unit (100) are not a constructive complication and do not involve a significant cost increase with respect to the economic advantages for the adoption of the alternating current motor.

Referring to FIG. 2, a shaft (12b) coaxial with the shaft (22a) of the rotor is splined at the right-hand end of the stator (10b). The shaft (12b) of the stator passes through the fixed support (4b) to engage in a reduction gear (3b) mounted in a box (40b) integral with the fixed support (4b). From the reduction gear (3b) an axle shaft (13b) protrudes, on which the right-hand wheel (1b) is mounted.

The reduction gear (3b) is of known type and not described in detail. In any case, the reduction gear (3b) can be omitted and therefore the shaft (12b) of the stator becomes the axle shaft that is directly connected to the right-hand wheel (1b).

The left part of the shaft (22a) of the rotor enters in the left-hand fixed support (4a) and is engaged with a rotation reversing device (7) mounted inside the fixed support (4a). An output shaft (23a) comes out of the rotation reversing device (7) and rotates in inverse direction with respect to the input shaft (22a) of the rotor.

For illustrative purposes, the rotation reversing device (7) comprises a first gear (70) splined on the input shaft (22a). The first gear (70) engages with a second gear (71) splined on the output shaft (23a).

The output shaft (23a) of the rotor engages with a reduction gear (3a) mounted in a box (40a) integral with the fixed support (4a). From the reduction gear (3a) an axle shaft (24a) protrudes, on which the right-hand wheel (1a) is mounted. The reduction gears (3a) and (3b) are identical. The left-hand axle shaft (24a) is coaxial with the right-hand axle shaft (13b).

When the motor (M1) is powered through the electronic unit (100), the rotor (20a) rotates in a predefined direction with respect to the stator (10b). Since the stator is rotatably mounted with respect to the fixed supports (4a, 4b) the stator (10b) rotates in opposite direction with respect to the rotor (20a).

Consequently, the right-hand wheel (1b) is driven into rotation by the stator (10b) in the rotation direction associated with the stator. Instead, the left-hand wheel (1a) is driven into rotation by the rotor (20a) in opposite direction with respect to the direction associated with the rotor because of the provision of the rotation reversing device (7). Therefore, both the wheel (1b) and the wheel (1a) rotate in the same direction.

Although in the figures the rotation reversing device (7) is disposed between the shaft (22a) of the rotor and the axle shaft (24a) of the right-hand wheel, it appears evident that the rotation reversing device (7) can be disposed between the shaft (12b) of the stator and the axle shaft (13b) of the left-hand wheel.

In a rectilinear travel, the travel of the wheels (1b) and (1a) is identical and therefore the rotor (20a) makes the same number of revolutions as the stator (10b) and the driving wheels (1a, 1b) revolve at the same speed.

When the vehicle makes a right curve, the travel of the internal wheel (1b) is shorter than the external wheel (1a). Consequently, the stator (10b) makes a number of revolutions lower than the rotor (20a).

On the contrary, when the vehicle makes a left curve, the travel of the internal wheel (1b) is longer than the external wheel (1a). Consequently, the rotor (10b) makes a number of revolutions lower than the stator (20a).

As a result, this configuration of electric motor also acts as differential gear, automatically distributing the rotational speed of the wheels (1a, 1b) during the curves.

Figure 1:
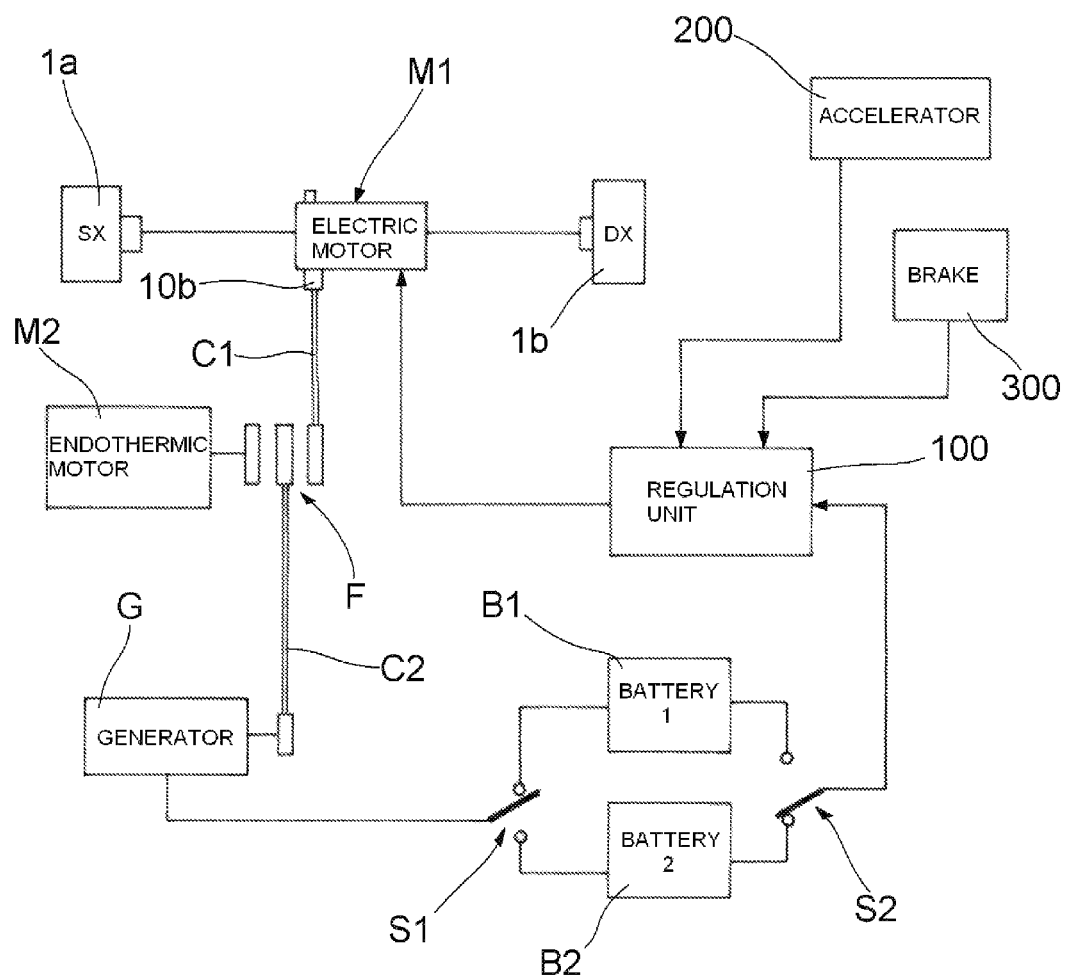
FIG. 1 is a block diagram that shows the motor vehicle with electric motor of the invention.

Referring to FIG. 1, in order to solve the typical problems of exclusively electric cars, the motor vehicle of the invention comprises an endothermic motor (M2), an electric generator (G) and two batteries (B1, B2).

The drive shaft of the endothermic motor (M2) is connected to a clutch (F). The clutch (F) is a three-way clutch and allows for coupling the drive shaft of the endothermic motor with the stator (10b) of the electric motor and/or a shaft of the electric generator (G), for example by means of belt or chain drives (C1, C2).

The electric generator (G) is electrically connected to a first switch (S1) that can switch between the input of a first battery (B1) and the input of a second battery (B2). A second switch (S2) electrically connected to the electronic regulation unit (100) that powers the electric motor (M1) can switch between the output of the first battery (B1) and the output of the second battery (B2).

The switches (S1) and (S2) are mutually switched on the two batteries (B1, B2). This means that if the first switch (S1) is switched on the first battery (B1), the second switch (S2) is normally switched on the second battery (B2). In such a way the first battery (B1) is charged by the generator (G) and the second battery (B2) is used to power the electric motor (M1).

Advantageously, the endothermic motor (M2) operates at steady state. In fact, the endothermic motor (M2) is not responsible for regulating the rotational speed of the driving wheels (1a, 1b), since this function is exclusively carried out by the electric motor (M1). Basically the endothermic motor can perform three functions:

charge the battery (B1) through the generator (G),
    drive the stator (10b) of the electric motor into rotation to transmit power through it to the electric motor, or
    simultaneously charge the battery (B1) and increase the power through the rotation of the stator (10b).

This involves several advantages, lower noise, lower contamination, higher efficiency of the endothermic motor that operates at a constant number of revolutions.

The regulation unit (100) is connected to a potentiometer of the accelerator (200) that sends a current signal proportional to the intensity of the acceleration given by the driver. In this way the electronic unit (100) sends the electric motor (M1) an amount of current proportional to the acceleration given by the driver regulating the rotational speed of the electric motor (M1).

The regulation unit (100) is also connected to a brake sensor (300) that sends a command signal to the unit (100) when the driver brakes. In this way the electronic unit (100) interrupts the power of the electric motor (M1) and allows for current flow from the electric motor (M1) to the battery (B2). Therefore the electric motor (M1) is converted into generator taking advantage of the inertial motion of rotor and stator. Consequently, the electric motor (M1) produces current to power the battery (B2) connected to it.

Numerous variations and modifications can be made to the present embodiment of the invention by an expert of the art, while still falling within the scope of the invention as claimed in the enclosed claims.

The invention claimed is:

1. A motor vehicle comprising:
   an electric motor comprising a rotor rotatably mounted on a stator, said electric motor being adapted to drive two axle shafts in rotation, respectively provided with driving wheels of the vehicle;
   at least one battery to electrically power said electric motor; and
   an electronic regulation unit connected to a potentiometer of the accelerator to adjust the power supply of said electric motor,
   wherein
   the stator of said electric motor is rotatably mounted on two fixed supports joined to the frame of the vehicle in order to rotate in opposite direction with respect to the rotation direction of the rotor;
   an axle shaft of a wheel being operatively connected to the stator in order to be driven into rotation by the stator;
   the axle shaft of the other wheel being operatively connected to the rotor in order to be driven into rotation by the rotor;
   said motor vehicle also comprising:
   a rotation reversing device to reverse the rotation of one of the two axle shafts of the wheels with respect to the rotation of the rotor or stator, respectively;
   an endothermic motor provided with a drive shaft;
   an electric generator separate from the electric motor and electrically connected to said at least one battery; and
   a three-way clutch configured to couple the drive shaft of said endothermic motor to the generator and/or stator of said electric motor.

2. The motor vehicle of claim 1, wherein said rotation reversing device comprises a first gear splined on a shaft connected to the rotor or stator that engages with a second gear splined on a shaft connected to an axle shaft.

3. The motor vehicle of claim 1, further comprising two reduction gears mounted between the stator and axle shaft of a wheel and between the rotor and axle shaft of the other wheel.

4. The motor vehicle of claim 1, wherein said endothermic motor operates in steady state.

5. The motor vehicle of claim 1, wherein said three-way clutch is connected to the stator of the electric motor by a first belt or chain drive, and said three-way clutch is connected to a shaft of said electric generator by a second belt or chain drive.

6. The motor vehicle of claim 1, further comprising:
   two batteries;
   a first switch connected to the electrical generator and adapted to switch between the input of the first battery and the input of the second battery, and;
   a second switch connected to the regulation unit that powers the electrical motor and adapted to switch between the output of the first battery and the output of the second battery.

7. The motor vehicle of claim 1, further comprising a brake sensor connected to said electronic regulation unit to control the inversion of the current flow from the electric motor to the battery in such a manner that the electric motor operates as generator during braking.

8. The motor vehicle of claim 1, wherein said electric motor is of alternating current type and comprises a rotary electric contact to electrically connect the rotary stator to said electronic regulation unit, said electronic regulation unit comprising a transformer to transform the direct current of the battery in alternating current and an inverter to control the frequency of the alternating current sent to said electric motor.

* * * * *